United States Patent [19]

Paweletz

[11] Patent Number: 5,710,494
[45] Date of Patent: Jan. 20, 1998

[54] SINGLE-MOTOR DRIVE FOR A SHAFTLESS SPINNING ROTOR AND METHOD FOR OPERATING SAME

[75] Inventor: Anton Paweletz, Fellbach, Germany

[73] Assignee: SKF Textilmaschinen-Komponenten GmbH, Stuttgart, Germany

[21] Appl. No.: 490,338

[22] Filed: Jun. 14, 1995

[30] Foreign Application Priority Data

Jun. 18, 1994 [DE] Germany ............... 44 21 406.5

[51] Int. Cl.⁶ ........................................... H02K 7/10
[52] U.S. Cl. ........................ 318/366; 318/375; 318/380
[58] Field of Search .................... 318/375, 379, 318/380, 480, 366

[56] References Cited

U.S. PATENT DOCUMENTS

| | | | |
|---|---|---|---|
| 3,931,560 | 1/1976 | Wilson | 318/481 |
| 5,317,221 | 5/1994 | Kubo et al. | 310/12 |

FOREIGN PATENT DOCUMENTS

| | | |
|---|---|---|
| 2238627 C3 | 8/1972 | Germany . |
| 2349072 B1 | 9/1973 | Germany . |
| 2433712 A1 | 7/1974 | Germany . |
| 3113909 A1 | 4/1981 | Germany . |
| 4128803 A1 | 8/1991 | Germany . |
| 4207673 C1 | 3/1992 | Germany . |
| 4-150718 | 9/1992 | Japan . |
| WO 92/01096 | 1/1992 | WIPO . |

*Primary Examiner*—Jonathan Wysocki
*Assistant Examiner*—Kim Lockett
*Attorney, Agent, or Firm*—Kennedy Covington Lobdell & Hickman, LLP

[57] ABSTRACT

A single-motor drive for an open-end spinning machine, the motor being in the form of an axial field motor with a magnet/gas bearing supporting the rotor with a gas cushion, includes a gas monitoring arrangement which will detect a disruption in the gas supply, and responsive to the gas disruption, a device for braking the rotor is connected with the circuit via a switch. The braking device, which includes a ballast resistor, is set for reducing the rotational speed of the rotor in a manner whereby when the rotor bearing surface lands on the stator bearing surface due to the collapse of the air cushion, its rotational speed is less than that which would result in damage to the bearing surfaces.

14 Claims, 3 Drawing Sheets

SINGLE-MOTOR DRIVE FOR A SHAFTLESS SPINNING ROTOR AND METHOD FOR OPERATING SAME

BACKGROUND OF THE INVENTION

The present invention relates to open-end rotor spinning machines and, more particularly, to a single motor drive including an axial field motor having a stator and a permanent-magnetic rotor defining a spinning chamber, the stator and the rotor having respective bearing surfaces facing one another, and a combined magnet/gas bearing having gas outlet openings connected with a gas supply and communicated between the respective bearing surfaces of the rotor and the stator for forming a gas cushion for supporting the rotor spaced from the stator and to a method for operating the single-motor drive.

In the course of further development of open-end rotor spinning machines it is particularly important to increase the productive output as well as to improve the quality of the produced yarns. In this connection, an increase in the rotational speed of the spinning rotor is key regarding an increase in productive output. For this reason different drive and bearing variants for spinning rotors were developed in order to achieve rpm in excess of 100,000 rpm. The reduction of the rotor mass and diameter, as well as a reduction in frictional losses, not only permits increased rotational speed, but also results in reduced energy consumption by the drive.

The use of shaftless spinning rotors, which are embodied as rotors of an axial field motor, is particularly advantageous for reducing frictional losses. A combined magnet/gas bearing, characteristic of such rotors including that used in the present invention, results in relatively small frictional losses.

A single-motor drive for a shaftless spinning rotor embodied as a permanent-magnetic rotor of an axial field motor is known from International Patent Publication WO 92/01096. There, a spinning rotor has a bearing face facing away from the rotor opening which is located opposite of a bearing face on the stator side, both bearing faces being separated by an air gap formed by a combined magnet/gas bearing with gas outlet openings for the build-up of a gas cushion. The gas outlet openings are connected with a gas supply line.

Problems can arise if the gas cushion is suddenly removed, which may result from a failure of the gas supply. Should this occur, the opposed bearing faces can come into contact with one another with the rotor rotating at a sufficient rotational speed to cause damage to the bearing faces upon contact.

SUMMARY OF THE INVENTION

It is accordingly an object of the present invention to further develop the known single-motor drive as well as the method for operating it in such a way that operational reliability is increased, particularly with respect to gas supply failures. More particularly, it is an object of the present invention to provide a method and apparatus for controlling the rotor upon failure of the gas supply and the subsequent loss of the gas cushion.

It is also an object of the present invention to provide a method and apparatus for controlling the rotor upon failure of both the gas supply and the electric current source for the motor.

To that end, and in a shaftless spinning rotor assembly for an open end spinning machine, the spinning rotor assembly including an axial field motor having a stator, stator phase excitation circuits, and a permanent-magnetic rotor defining a spinning chamber, the stator and the rotor having respective beating surfaces facing one another, and a combined magnet/gas bearing having gas outlet openings connected with a gas supply and communicated between the respective bearing surfaces of the rotor and the stator for forming a gas cushion for supporting the rotor spaced from the stator, an improvement according to the preferred embodiment of the present invention is provided which comprises an arrangement for detecting an interruption of the gas supply, an assembly for braking the rotor, and an assembly for actuating the braking assembly in response to detection of an interruption in the gas supply by the detecting arrangement, the actuating assembly being operative to connect the braking assembly to a power supply to the stator, the braking assembly being operative to slow rotation of the rotor at a rate sufficient to reduce the rotational speed below a predetermined speed which would result in damage to the respective bearing surfaces, said reduction occurring before the bearing surface of the rotor engages the bearing surface of the stator.

The gas cushion of the magnet/gas bearing is indispensable for maintaining the bearing gap. A reduction in the gas pressure can have the result that the bearing surfaces on the rotor and stator side come into contact with each other because of magnetic attraction. With a high rotor rotational speed, the friction of the bearing surfaces on each other can lead to extensive damage of the bearing surfaces and likely render the drive unusable. This damage can be prevented or greatly limited to such an extent that the usefulness of the drive is retained if the contact between the bearing surfaces occurs at a rotational speed below that which would result in extensive damage. The critical rotational speed here is particularly dependent on the structure of the two bearing surfaces.

A primary feature of the method and apparatus of the present invention is that, if because of an interruption in the compressed air supply the rotor "lands" on the stator, the rotor can be braked so rapidly that it is below the critical rotational speed when landing.

It is also possible by means of the measure in accordance with the present invention to reduce the gas volume made available for buffering the gas supply, since the time period for maintaining a gas pressure which assures the air cushion for the bearing can be reduced because of rotor braking. This advantage is effective particularly in those cases where, because of a complete loss of current or compressed air over the entire machine, which affects many rotors, the gas cushion at the rotors must be maintained for a predetermined period of time. To prevent damage to the bearing surfaces, the unbraked downwinding of the rotors would require a gas cushion of such a size that it could assure the gas supply over the entire time the rotors are winding down.

In further accordance with the present invention, the braking assembly preferably includes a ballast resistor being connectable in parallel with the power supply circuit for the stator by the actuating assembly. The actuating assembly preferably includes a relay connected in series with the ballast resistor. It is preferred that the relay is connected with a control device which actuates the relay responsive to an interruption in the gas supply being detected by the detecting arrangement.

Alternately, the actuating assembly may include a gas pressure switch which automatically closes responsive to a pressure reduction in the gas supply beyond a predetermined threshold value.

Further, the ballast resistor may be integrated into a D.C. intermediate circuit upstream of the stator phase excitation circuits.

According to a second preferred embodiment of the present invention, a plurality of ballast resistors are connected in parallel in the stator phase excitation circuits, with each phase excitation circuit having equal ballast resistance values. Further, a second actuating assembly is preferably connected in series with the power supply circuit for the stator and is connected with a control device for opening the circuit responsive to said detecting means detecting an interruption of the gas supply in combination with a control current loss and for isolating the ballast resistor from the power supply. It is further preferred that the second actuating assembly is connectable with the control device by a time delay device. The second actuating assembly may include a relay operated switch disposed downstream of a filter capacitor in the power supply.

Preferably, a supply unit for rotor position detection signals and a logic circuit for generating transistor firing pulses at the stator phase excitation circuits is connected in parallel with the ballast resistor.

According to the method of the present invention, a single drive motor drive is operated by monitoring the gas pressure in the gas supply, detecting a pressure value that is less than a predetermined threshold value and, responsive to a detection of a gas pressure that is less than the predetermined value, braking the rotor at a rate to cause the rotor to be rotating a rotational speed which is less than a predetermined value so that, when the rotor bearing surface lands on the bearing surface on the stator because of a collapse of the air cushion due to a gas supply failure, the rotor bearing surface and the stator bearing surface are not damaged.

Preferably, a ballast resistor is provided and said step of braking the rotor includes the step of shunting the ballast resistor to ground responsive to a failure of the control current in the current supply of the stator. In addition, the method preferably includes feeding the voltage generated in the braking phase of the rotor to a supply unit for position detection signals of the rotor and to a logic circuit for generating transistor firing pulses at the stator phase inputs, whereby any rotor braking energy is dissipated by ballast resistor heating, the feeding step occurring responsive to a control voltage reaching a predetermined threshold value.

While in case of an interruption of only the gas supply it is possible to brake the motor in a controlled manner by appropriate transistor ignition pulses, the energy supply for the position recognition signals and the corresponding logical device for preparing the transistor ignition pulses is no longer available when the current fails. Braking by means of an appropriately high D.C. voltage is also not possible. The latter variant is also not possible if although the current supply is not disrupted, the compressed air interruption applies to the entire spinning machine, since extremely high energy would be required for braking in an opposing field at all spinning stations, for which the energy supply usually is not designed. However, such motor braking is possible if the compressed air drop occurs at only one spinning station.

Monitoring of the gas pressure is possible at the individual spinning stations as well as centrally. Combined monitoring is also conceivable, in which case a control device can trigger the manner of braking as a function of whether there is a central interruption or only an interruption in the area of only one spinning station. There is also the option of braking by using only one opposing field in case of a disruption in the area of only one spinning station, since in this case the energy requirement is limited.

In case of a power supply failure, the motor transfers its kinetic energy to the ballast resistor by acting as a generator, which dissipates the rotor energy as heat. The braking induction required for braking in accordance with the present invention may also be defined by an appropriate selection of the ballast resistor. In this case it is not necessary to exchange the respective ballast resistors, if a selectively variable resistor has been employed from the start, wherein the resistance value thereof can be adapted to the respective rotor inertia.

It must be assured that in case of a combination of a gas pressure and power supply, or current supply failure the ballast resistor is automatically connected by the circuit in accordance with the present invention. Therefore, an appropriate switch must be closed automatically.

Braking of the rotor in accordance with the present invention can take place either by the integration of a ballast resistor into a D.C. intermediate circuit placed upstream of the stator phase excitation circuits, or by the integration of ballast resistors into the stator phase excitation circuits themselves.

A second switch is required to disconnect the circuit and to concentrate the current flow on the ballast resistor. This switching should take place with a time delay associated with the connection of the ballast resistor in order to be able at disconnection to immediately reduce the voltage which was created by the generating action of the rotor. The voltage induced in the braking phase by the drive acting as a generator can also be used to provide a supply unit with current for the position recognition signals of the rotor and an appropriate logical device for generating transistor ignition pulses at the phase inputs. When a control voltage required for this is downwardly exceeded, braking takes place by heating of the ballast resistor or resistors, dependent on the resistor arrangement.

By the above, the present invention provides a single motor drive having a control apparatus and associated method to rapidly brake a spinning rotor which has suffered a loss of its gas cushion due to a failure of the gas supply, or a loss of excitation current due to a failure of the power supply, or both.

DETAILED DESCRIPTION OF THE PREFERRED EMBODIMENTS

Figure 1:
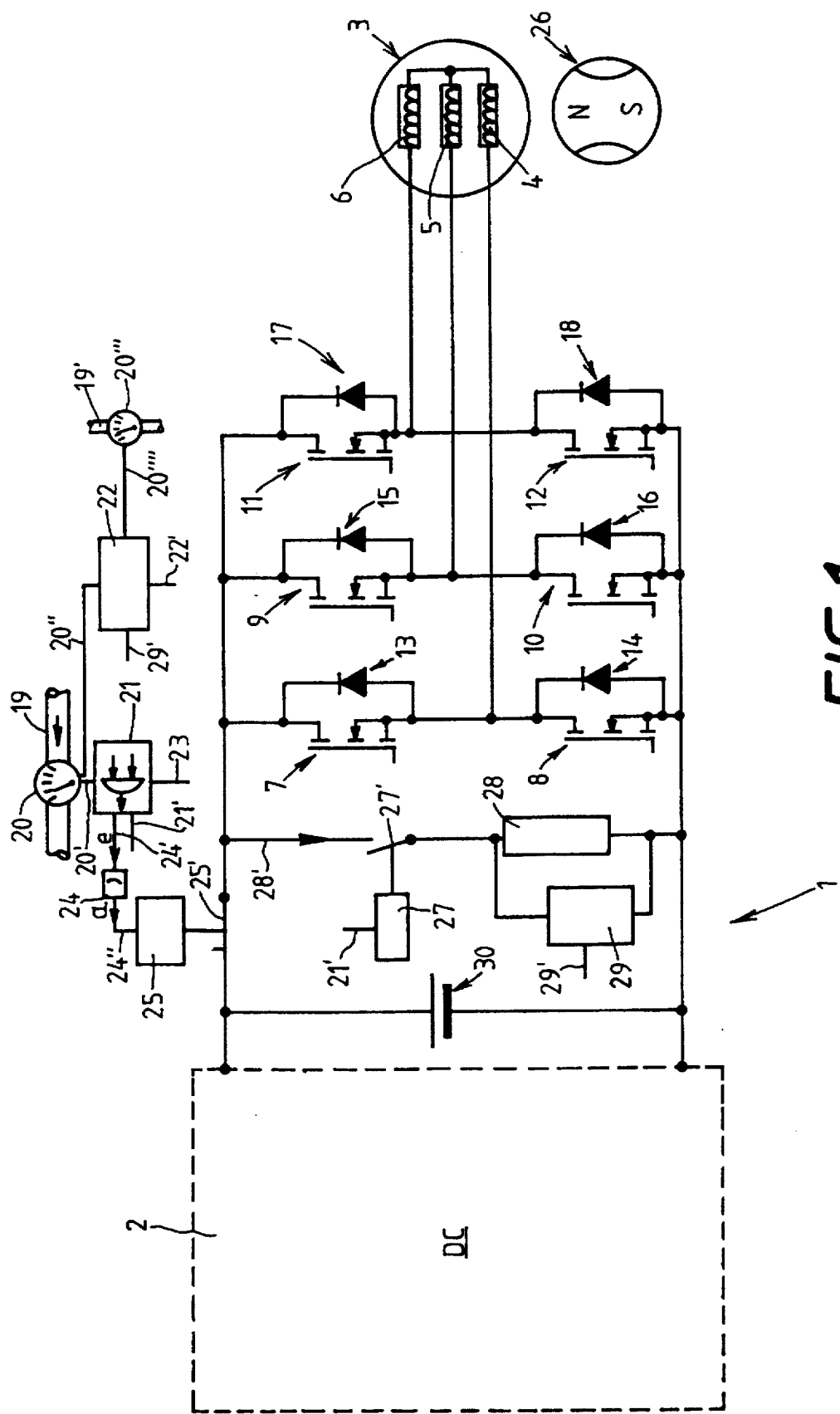
FIG. 1 is a schematic view of a circuit for driving and braking a shaftless spinning rotor, according to a first preferred embodiment of the present invention.

Turning now to the drawings, and more specifically to FIG. 1, a current supply 1 for a stator 3 of a single-motor drive of a shaftless spinning rotor 26 is equipped with a D.C. voltage source 2. The current supply 1 is designed as a voltage inverter, which includes a capacitor 30. Transistors 7 and 8 along with associated diodes 13 and 14, transistors 9 and 10 along with associated diodes 15 and 16, and transistors 11 and 12 along with associated diodes 17 and 18 are responsible for the phased clocking of the current flow as well as the direction of current flow for the stator windings 4, 5, 6, here connected in a wye-type polyphase connection, of the stator 3. Circuitry leading from the transistors 7, 8, 9, 10, 11, 12 to the stator windings 6 comprises a stator phase excitation circuit. The electrical commutation for the operation of the motor drive as a synchronous motor takes place in this manner.

The spinning rotor 26 is illustrated in FIG. 1 with the appropriate magnetic polarity. It constitutes a permanent-magnetic rotor of the axial field motor, although the permanent-magnetic properties necessary for the present invention need not be achieved directly by permanent magnets. A rotor made of a magnetically conductive material may also be magnetized by the magnetic field of the stator in such a way that permanent-magnetic properties result, which are required for the drive as well as for the braking induction in the stator during the braking phase, i.e., during operation as a generator.

A gas supply line 19 for the supply of gas to the magnet/gas bearing is disposed between the stator 3 and the spinning rotor 26 and has a gas pressure gauge 20. The gas pressure gauge 20 can be a simple sensor set to a predetermined gas pressure threshold value and independent of a voltage supply. The gas supply line 19 is connected with a gas supply device, which is typically a compressor (not shown).

An information line 20' sends information from the gas pressure gauge 20 to a control unit 21 embodied as an AND-gate. A further information line 23, which signals a voltage failure, also leads to this control unit 21.

A control line 21' leads from the output of the control device 21 to a first relay 27 which is operationally connected to a switch 27'. Further a control line 24' leads to a delay device 24, the output of which is in turn connected via a line 24" with a second relay 25 which is operationally connected to a relay actuated switch 25'. The relay actuated switch 25' is disposed within the circuit downstream of the capacitor 30. Therefore, the capacitor 30 is isolated from the ballast resistor 28 and any energy stored in the capacitor 30 need not be dissipated with the rotor energy. The respective positions of the switches 25' and 27' illustrated in FIG. 1, as well as the positions of switch 55' and switch 59' illustrated in FIG. 2, correspond to the normal operational state thereof.

If, in addition to a no longer tolerable gas pressure loss, a voltage disruption is detected by the control unit 21, a line section 28' with a ballast resistor 28 is short-circuited by operation of the relay 27. Following the closing of this line section 28', the switch 25' is actuated by the second relay 25, because of which the line section leading to the D.C. voltage source 2 is opened. Accordingly, the current flowing because of the induced voltage is exclusively routed through the line section 28' and its ballast resistor 28.

A further control line 20" comes off the gas pressure gauge 20 and leads to a control device 22. This control device 22 contains a logical device for generating transistor firing pulses for the transistors 7, 8, 9, 10, 11, 12. In this case, the logical device for the transistor firing pulses during normal operation, as well as the logical device for controlled braking of the rotor 26, can be contained in the control device 22. During normal operation, the control device 22 is connected by a line 22' with the power supply of the drive.

If this power supply is interrupted, it is possible to assure a current supply for the control device 22 for a defined period of time through a line 29' from a voltage supply unit 29. This voltage supply unit 29 is disposed within the circuit and switched parallel with the ballast resistor 28.

Following the closing of the line section 28' by means of the relay 27, the voltage supply unit 29 is fed with the voltage induced by the rotor 26. If the induced voltage falls below a certain value because of the decreasing rotor rotational speed, the voltage supply unit 29 can no longer be sufficiently supplied with a voltage, because of which the braking energy is reduced almost exclusively via the ballast resistor 28. This takes place automatically whereby the current supply unit 29 is automatically switched off when the voltage falls below the respective threshold value.

Although it is possible to convert the braking energy into heat energy exclusively by using of the ballast resistor 28, it is advantageous to use the voltage induced during braking for supplying the control device 22 with current for generating the transistor firing pulses. Depending on which sensors are employed for the position detection of the rotors, the current supply should also simultaneously be used for generating the position detection signals.

As previously discussed, monitoring of the gas pressure at the individual spinning stations to detect a loss of gas pressure can take place individually or simultaneously. An appropriate gas pressure gauge 20''' is disposed on a gas supply line 19' for the individual spinning station or the individual axial field motor, branched off the gas supply line 19. Information regarding a disruption of the compressed air supply at the individual spinning station also reaches the control device 22 through a signal line 20''''.

If a pressure drop is indicated at the gas pressure gauge 20''', braking of the motor either by appropriate transistor firing pulses or controlled by an opposing field can take place via the control device 22. Braking by means of an opposing field is possible if only individual spinning stations are to be braked, since the energy required for this is easily available.

Figure 2:
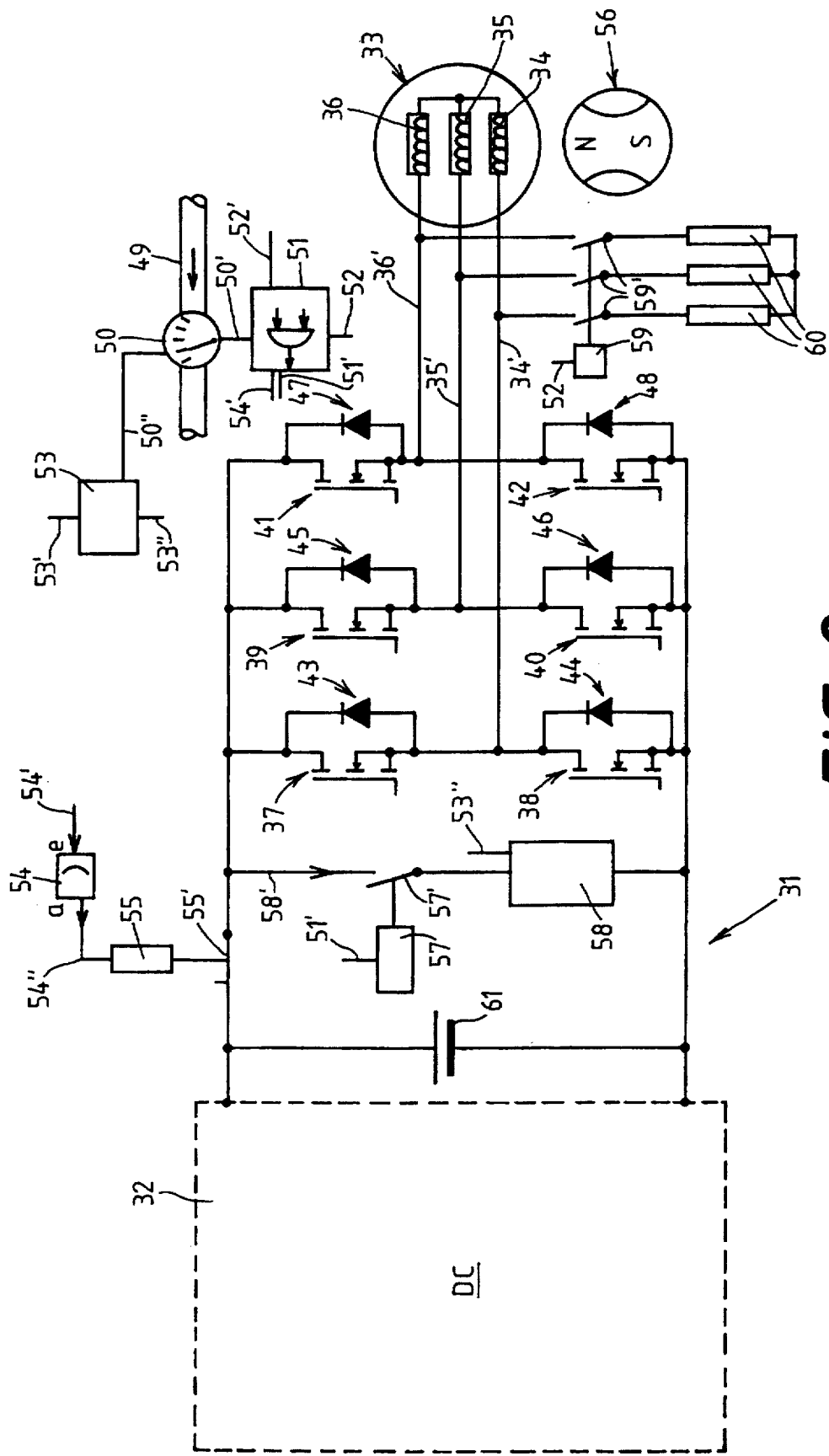
FIG. 2 is a schematic view of a circuit for driving and braking a shaftless spinning rotor, according to a second preferred embodiment of the present invention.

According to a second preferred embodiment of the present invention, and as illustrated in FIG. 2, the power, or current supply, 31 is connected with a D.C. current source 32. As in the first preferred embodiment, transistors 37 and 38 along with associated diodes 43 and 44, transistors 39 and 40 along with associated diodes 45 and 46, and transistors 41 and 42 along with associated diodes 47 and 48 are provided to supply the stator windings 34 to 36 of the stator 33 and to drive the spinning rotor 56. Further and in accordance with the first preferred embodiment, a capacitor 61 is provided as a component of the current supply 31.

Ballast resistors 60 are connected in parallel in the stator phase excitation circuits 34',35',36', with each phase excitation circuit 34',35',36' having equal ballast resistance values. A first relay 59 actuates switches 59' for all three phases simultaneously. The relay 59 is triggered through a control line 52 by a control unit 51 embodied as an AND-gate. Similarly to the first preferred embodiment, the control unit 51 has a connecting line 50' to a gas pressure gauge 50 monitoring the gas pressure in a gas supply line 49, in order to detect a failure or other interruption of the gas supply. A signal line 52' at the input of the control unit 51 supplies a signal when the current supply has failed. Further control lines 51' and 54' are also connected with the output of the control unit 51, besides the already mentioned line 52.

The line 54' leads to a delay device 54, whose output is connected through a line 54" with a second relay 55 operationally connected with a relay activated switch 55'. As seen in FIG. 2, the relay 55 and its associated switch 55' are disposed in the circuit downstream of the capacitor 61. Therefore, the capacitor 61 is isolated from the ballast resistors 60, and the energy stored therein need not be dissipated with the rotor energy. As was the case in the first preferred embodiment, the normally closed line section is interrupted in case of a gas pressure drop.

The control line 51' leads to a third relay 57, which can short-circuit a line section 58' using a switch 57'. A voltage supply unit 58 is connected with this line section 58', which, analogously to the voltage supply unit 29, following a current failure supplies a voltage for generating transistor firing pulses until this voltage has fallen below a threshold value. In this embodiment, a control unit 53 is operated analogously to the control device 22 of the first embodiment. By using a signal line 50", the control unit 53 receives information when gas pressure falls below a predetermined minimum value. Voltage supply takes place either through a line 53 under normal conditions or, with a voltage failure, from the voltage supply unit 58 through the line 53".

Instead of the control units 21 and 51, embodied as AND-gates, it is also possible to replace the relays 27 and 57, which are triggered as described, directly by gas pressure switches which are maintained in a normal condition by the operational pressure. It must be assured in every case that there is a rapid reaction to a disruption in the gas pressure supply and that in case of a current failure the appropriate line connections which cause the rapid braking of the rotors in accordance with the present invention are automatically made.

Figure 3:
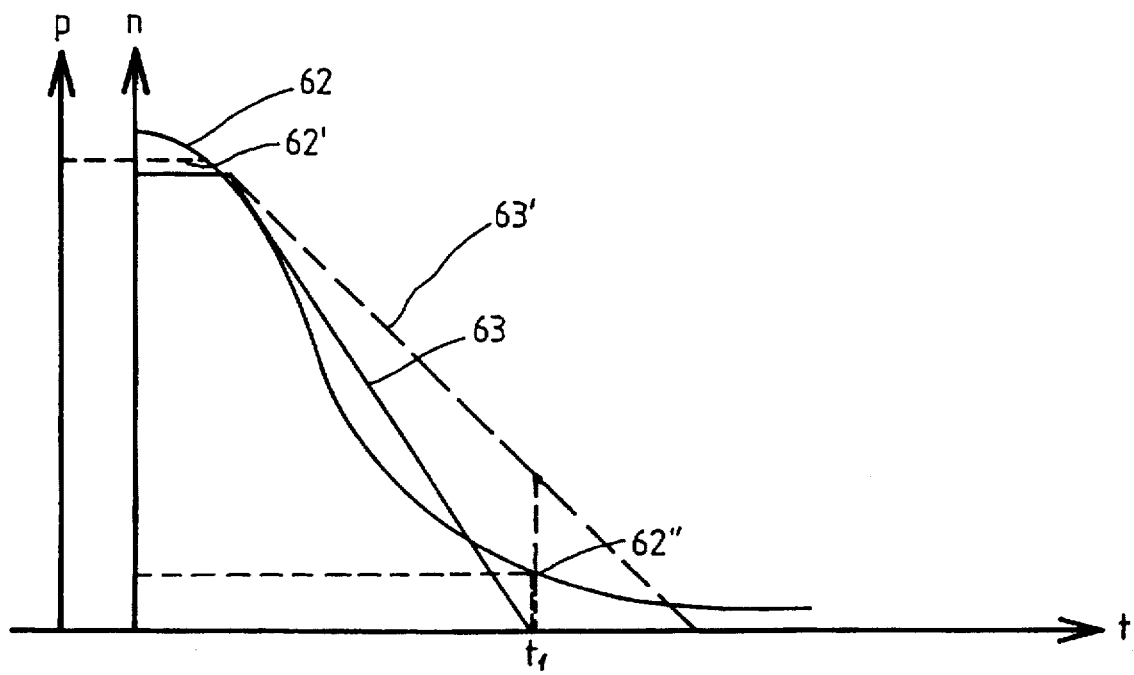
FIG. 3 is a graphic representation of the chronological course of the gas pressure and rotor rotational speed in case of a disruption.

FIG. 3 contains a graphic representation of the chronological course of the pressure p and the rotational speed n in case of a disruption. In this case the curve 62 represents the drop of the gas pressure which, when falling below a threshold value 62', initiates rotor braking with rotational speed being represented by line 63. The intersection 62" of a line in parallel relation with the abscissa, with the gas pressure curve 62 indicates the threshold pressure value at or below which the air cushion between the two oppositely located bearing surfaces can no longer be maintained. It can be seen from this representation of FIG. 3, that at this time $t_1$ the rotor has already been braked to a rotational speed which equals zero during along the rotational speed line 63. Damage to the bearing surfaces is completely prevented by means of this. However, as previously discussed, as a function of the material of the bearing surfaces it is also possible to set a braking speed by means of the selection of the ballast resistor in such a way that a curve 63' for the rotation speed of the rotor results. In this case the rotor rpm at the time $t_1$ still is in a range in which the heat generated when the two bearing surfaces meet does not lead to permanent damage of the bearing surfaces. As previously explained, this setting must be determined as a function of the material and the solidity of the bearing surfaces.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a shaftless spinning rotor assembly for an open end spinning machine, the spinning rotor assembly including an axial field motor having a stator, stator phase excitation circuits, and a permanent-magnetic rotor defining a spinning chamber, the stator and the rotor having respective bearing surfaces facing one another, and a combined magnet/gas bearing having gas outlet openings connected with a gas supply and communicated between the respective bearing surfaces of the rotor and the stator for forming a gas cushion for supporting the rotor spaced from the stator, the improvement comprising means for detecting an interruption of the gas supply, means for braking the rotor and means for actuating said braking means in response to detection of an interruption in the gas supply by said detecting means, said actuating means being operative to connect said braking means to a power supply to the stator, said braking means being operative to slow rotation of the rotor at a rate sufficient to reduce the rotational speed below a predetermined speed which would result in damage to the respective bearing surfaces, said reduction occurring before the beating bearing surface of the rotor engages the bearing surface of the stator.

2. A spinning rotor assembly according to claim 1, wherein the braking means includes a ballast resistor being connectable in parallel with the power supply circuit for the stator by said actuating means.

3. A spinning rotor assembly according to claim 2 wherein said actuating means includes a relay connected in series with said ballast resistor.

4. A spinning rotor assembly according to claim 3 wherein said relay is connected with a control device which actuates said relay responsive to an interruption in the gas supply being detected by said detecting means.

5. A spinning rotor assembly according to claim 2 wherein said actuating means includes a gas pressure switch which automatically closes responsive to a pressure reduction in the gas supply beyond a predetermined threshold value.

6. A spinning rotor assembly according to claim 2 wherein said ballast resistor is integrated into a D.C. intermediate circuit upstream of the stator phase excitation circuits.

7. A spinning rotor assembly according to claim 2 wherein a plurality of ballast resistors are connected in parallel in the stator phase excitation circuits, with each phase excitation circuit having equal ballast resistance values.

8. A spinning rotor assembly according to claim 1 wherein a second actuating means is connected in series with the power supply circuit for the stator and is connected with a control device for opening the circuit responsive to said detecting means detecting an interruption of the gas supply in combination with a control current loss and for isolating the ballast resistor from the power supply.

9. A spinning rotor assembly according to claim 6 wherein the second actuating means is connectable with the control device by a time delay device.

10. A spinning rotor assembly according to claim 4 wherein a supply unit for rotor position detection signals and a logic circuit for generating transistor firing pulses at the stator phase excitation circuits is connected in parallel with the ballast resistor.

11. A spinning rotor assembly according to claim 8 wherein said second actuating means includes relay operated switches disposed downstream of a filter capacitor in the power supply.

12. A method for operating a single-motor drive of a spinning rotor embodied as a rotor of an axial field motor of an open end spinning machine, wherein the spinning rotor includes a bearing surface and a stator includes a bearing surface, the rotor being seated in a combined magnet/gas bearing formed by the bearing surfaces and a gas cushion which is created and maintained by gas introduced into a gas gap between the two bearing surfaces from a pressurized gas supply, said operating method being useful to prevent at least some damage to the bearing surfaces, and comprising the steps of monitoring the gas pressure in the gas supply, detecting a pressure value that is less than a predetermined threshold value and, responsive to a detection of a gas pressure that is less than said predetermined value, braking the rotor at a rate to cause the rotor to be rotating a rotational speed which is less than a predetermined value so that, when the rotor bearing surface lands on the bearing surface on the stator because of a collapse of the air cushion due to a gas supply failure, the rotor bearing surface and the stator bearing surface are not damaged.

13. A method for operating a single-motor drive of a spinning unit according to claim 12 wherein a ballast resistor is provided and said step of braking the rotor includes the step of shunting said ballast resistor to ground responsive to a failure of the control current in the current supply of the stator.

14. A method for operating a single-motor drive of a spinning unit according to claim 13 and further comprising the step of feeding the voltage generated in the braking phase of the rotor to a supply unit for position detection signals of the rotor and to a logic circuit for generating transistor firing pulses at the stator phase inputs, whereby any rotor braking energy is dissipated by ballast resistor heating, said feeding step occurring responsive to a control voltage reaching a predetermined threshold value.

* * * * *